US010095190B2

(12) United States Patent
Kim

(10) Patent No.: US 10,095,190 B2
(45) Date of Patent: Oct. 9, 2018

(54) SMART WATCH AND METHOD OF REPLACING COMPONENTS OF THE SAME

(71) Applicant: Samsung Display Co., Ltd., Yongin-si, Gyeonggi-do (KR)

(72) Inventor: Minjae Kim, Yongin-si (KR)

(73) Assignee: Samsung Display Co., Ltd., Youngin-si (KR)

( * ) Notice: Subject to any disclaimer, the term of this patent is extended or adjusted under 35 U.S.C. 154(b) by 216 days.

(21) Appl. No.: 15/255,055

(22) Filed: Sep. 1, 2016

(65) Prior Publication Data

US 2017/0060092 A1 Mar. 2, 2017

(30) Foreign Application Priority Data

Sep. 2, 2015 (KR) .......................... 10-2015-0124311

(51) Int. Cl.
| | | |
|---|---|---|
| *G04G 9/00* | (2006.01) | |
| *G04G 17/04* | (2006.01) | |
| *G06F 1/16* | (2006.01) | |

(52) U.S. Cl.
CPC .............. *G04G 9/00* (2013.01); *G04G 9/0035* (2013.01); *G04G 17/045* (2013.01); *G06F 1/1637* (2013.01)

(58) Field of Classification Search
CPC ...... G04G 9/00; G04G 9/0035; G04G 17/045; G06F 1/1637
See application file for complete search history.

(56) References Cited

U.S. PATENT DOCUMENTS

| 6,730,415 | B2* | 5/2004 | Shibuya | ............... | A44C 27/006 |
| | | | | | 204/192.16 |
| 8,502,788 | B2* | 8/2013 | Cho | ...................... | G06F 1/1626 |
| | | | | | 345/173 |
| 9,098,242 | B2* | 8/2015 | Rappoport | ........... | G06F 1/1656 |
| 9,389,776 | B2* | 7/2016 | Kim | ...................... | G06F 3/0488 |
| 2006/0037361 | A1* | 2/2006 | Johnson | ............... | A44C 27/002 |
| | | | | | 63/37 |
| 2010/0086756 | A1* | 4/2010 | Miya | .................... | A44C 27/006 |
| | | | | | 428/213 |
| 2011/0293742 | A1* | 12/2011 | Yang | ..................... | A01N 59/16 |
| | | | | | 424/618 |
| 2013/0002583 | A1* | 1/2013 | Jin | ........................ | G06F 1/1637 |
| | | | | | 345/173 |

(Continued)

FOREIGN PATENT DOCUMENTS

| KR | 10-1427260 B1 | 7/2014 |
| KR | 10-1492779 B1 | 2/2015 |
| KR | 10-2015-0025206 A | 3/2015 |

*Primary Examiner* — Vit W Miska
(74) *Attorney, Agent, or Firm* — Lewis Roca Rothgerber Christie LLP

(57) ABSTRACT

A smart watch and a method of replacing components of the same are disclosed. In one aspect, the smart watch includes a display panel including a body portion having a polygonal shaped planar structure and a corner portion extending from one side of the body portion and being bent away from the surface of, and at the side of, the body portion. The smart watch also includes a housing disposed under the display panel and having an area that is smaller than the combined area of the body portion and the corner portion. The corner portion is defined by the one side of the body portion and two adjacent sides.

20 Claims, 13 Drawing Sheets

(56) References Cited

U.S. PATENT DOCUMENTS

| | | | |
|---|---|---|---|
| 2013/0133788 A1* | 5/2013 | Aljerf | C22C 1/002 148/548 |
| 2014/0028597 A1* | 1/2014 | Cho | G06F 3/0487 345/173 |
| 2016/0010194 A1* | 1/2016 | Dubach et al. | C22C 16/00 148/403 |
| 2016/0109852 A1* | 4/2016 | Kuwabara | G04B 19/00 368/223 |
| 2017/0002473 A1* | 1/2017 | Trejo-Cordova | A61L 31/082 |
| 2017/0018250 A1* | 1/2017 | Shai | G06F 1/1615 |
| 2017/0083110 A1* | 3/2017 | Bostick | G06F 3/03 |
| 2018/0059729 A1* | 3/2018 | Raff | H01L 51/0097 |

\* cited by examiner

SMART WATCH AND METHOD OF REPLACING COMPONENTS OF THE SAME

CROSS-REFERENCE TO RELATED APPLICATION

This U.S. non-provisional patent application claims priority under 35 U.S.C. §119 of Korean Patent Application No. 10-2015-0124311, filed on Sep. 2, 2015, the contents of which are hereby incorporated by reference in its entirety.

BACKGROUND

Field

The described technology generally relates to a smart watch and a method of replacing components of the smart watch.

Description of the Related Technology

In recent years, there has been an increase in market demand for a smart watch. The smart watch is a wrist watch equipped with a data processor and an embedded operating system which permits dynamic changes and upgrades to functionality.

In addition, a variety of packaging designs enable the expression individuality and fashion to a smart watch consumer.

SUMMARY OF CERTAIN INVENTIVE ASPECTS

One inventive aspect relates to a smart watch being available in a variety of shapes.

Another aspect is a method of easily replacing components of the smart watch.

Another aspect is a smart watch including a display panel and a housing. The display panel includes a body portion having a polygonal shape and a corner portion extending from at least one side of the body portion and bent from the body portion. The housing is disposed under the display panel and has an area smaller than an area obtained by adding an area of the body portion to an area of the corner area.

The corner portion is defined by the one side of the body portion and sides extending from other sides, which are connected to the one side of the body portion, to meet each other.

The body portion has a substantially octagonal shape and the corner portion has a substantially triangular shape. The display panel has a substantially quadrangular shape when the body portion is placed on the same surface as the corner portion.

The housing includes a bottom portion overlapped with the body portion and a sidewall portion facing a surface in a thickness direction of the bottom portion and extending an edge of the bottom portion.

The bottom portion has a shape different from that of the body portion. The bottom portion has a substantially circular shape. The bottom portion includes a slit formed at a portion thereof to face the corner portion.

The bottom portion includes a concave portion formed at a portion thereof to have a same shape as the body portion.

The sidewall portion includes a transparent area facing the corner portion and an opaque area disposed adjacent to the transparent area.

The smart watch further includes a shape memory alloy disposed under a lower surface of the display panel, and at least a portion of the shape memory alloy is overlapped with the one side of the body portion.

The smart watch further includes a window cover disposed on the display panel and coupled to the housing, and the window cover has a same shape as the bottom portion.

The smart watch further includes a circuit board connected to the one side of the body portion.

Another aspect is a method of replacing a component of a smart watch, including separating a display panel in a bent state from a first housing, the bent display panel including a body portion having a polygonal shape and a corner portion extending from at least one side of the body portion and bent from the body portion, stretching out the corner portion such that the corner portion is placed on the same surface as the body portion to provide the display panel in a flat state, and assembling the flat display panel to a second housing having a shape different from the first housing.

The first housing includes a first bottom portion overlapped with the body portion and having an area smaller than an area obtained by adding an area of the body portion to an area of the corner portion and a first sidewall portion facing a surface in a thickness direction of the first bottom portion and extending along an edge of the first bottom portion.

The second housing includes a second bottom portion overlapped with the flat display panel and having an area greater than the area obtained by adding the area of the body portion to the area of the corner portion and a second sidewall portion bent from the second bottom portion.

The method further includes assembling a window cover having a same shape as the second bottom portion to the second housing.

Another aspect is a method of replacing a component of a smart watch, including separating a display panel in a flat state from a second housing, the flat display panel including a body portion having a polygonal shape and a corner portion extending from at least one side of the body portion, folding the corner portion such that the corner portion forms a predetermined angle with the body portion to provide the display panel in a bent state, and assembling the bent display panel to a first housing having a shape different from the second housing.

Another aspect is a smart watch comprising: a display panel comprising a body portion having a polygonal shaped planar structure and a corner portion extending from one side of the body portion and being bent away from the surface of, and at the side of, the body portion; and a housing disposed under the display panel and having an area that is smaller than the combined area of the body portion and the corner portion, wherein the corner portion is defined by the one side of the body portion and two adjacent sides.

In the above smart watch, the body portion has a substantially octagonal shape.

In the above smart watch, the corner portion has a substantially triangular shape.

In the above smart watch, the display panel has a substantially quadrangular shape when the body portion is placed on the same surface as the corner portion.

In the above smart watch, the housing comprises: a bottom portion having a planar surface overlapping the body portion; and a sidewall portion surrounding the bottom portion and extending outside the surface and at an edge of the bottom portion.

In the above smart watch, the bottom portion and the body portion have different shapes.

In the above smart watch, the bottom portion has a substantially circular shape.

In the above smart watch, the bottom portion has a slit through which the corner portion passes.

In the above smart watch, the bottom portion comprises a concave portion having the same shape as the body.

In the above smart watch, the sidewall portion comprises a transparent area facing the corner portion and an opaque area disposed adjacent to the transparent area.

The above smart watch further comprises a shape memory alloy disposed under a lower surface of the display panel, wherein at least a portion of the shape memory alloy overlaps the one side of the body portion.

The above smart watch further comprises a window cover disposed over the display panel and coupled to the housing, wherein the window cover has the same shape as the bottom portion.

The above smart watch further comprises a circuit board connected to the one side of the body portion.

In the above smart watch, the corner portion includes a plurality of corner portions, wherein the housing includes a plurality of slits into which the corner portions are inserted.

In the above smart watch, less than half of the corner portions are inserted into the slits.

Another aspect is a method of replacing a component of a smart watch, the method comprising: separating a display panel in a bent state from a first housing, the bent display panel comprising a body portion having a polygonal shape and a corner portion extending from at least one side of the body portion and bent from the body portion; stretching out the corner portion such that the corner portion is placed on the same surface as the body portion to provide the display panel in a flat state; and assembling the flat display panel to a second housing having a shape different from that of the first housing.

In the above method, the first housing comprises: a first bottom portion overlapping the body portion and having an area smaller than a combined area of the body portion and the corner portion; and a first sidewall portion extending along an edge of the first bottom area in a thickness direction of the first bottom portion.

In the above method, the second housing comprises: a second bottom portion overlapping the flat display panel and having an area greater than the combined area; and a second sidewall portion bent from the second bottom portion.

The above method further comprises assembling a window cover having the same shape as the second bottom portion to the second housing.

Another aspect is method of replacing a component of a smart watch, the method comprising: separating a display panel in a flat state from a first housing, the flat display panel comprising a body portion having a polygonal shape and a corner portion extending from at least one side of the body portion; folding the corner portion such that the corner portion forms a predetermined angle with the body portion to provide the display panel in a bent state; and assembling the bent display panel to a second housing having a shape different from the first housing.

In the above method, the assembling comprises inserting the corner portion into a slit in the second housing.

According to at least one of the disclosed embodiments, the smart watch can be implemented with a variety of shapes without additional processes.

DETAILED DESCRIPTION OF CERTAIN INVENTIVE EMBODIMENTS

Figure 1:
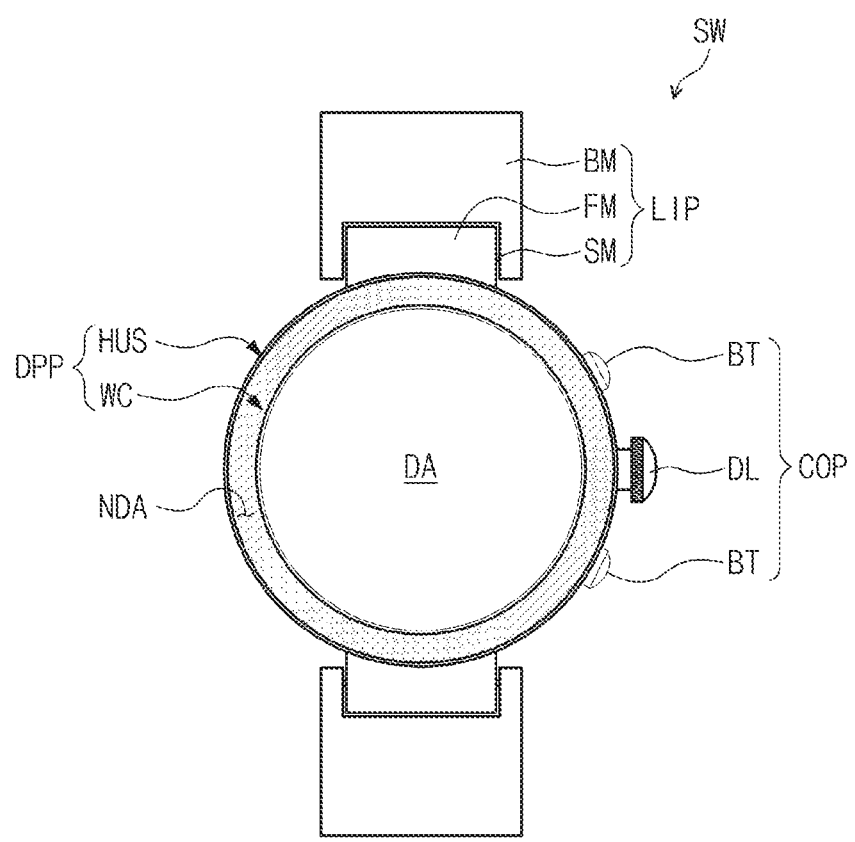
FIG. 1 is a plan view showing a smart watch according to an exemplary embodiment of the present disclosure.

It will be understood that when an element or layer is referred to as being "on", "connected to" or "coupled to" another element or layer, it can be directly on, connected or coupled to the other element or layer or intervening elements or layers can be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. can be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the described technology.

Spatially relative terms, such as "beneath", "below", "lower", "above", "upper" and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device can be otherwise oriented (rotated 90 degrees or at other orientations) and the spatially relative descriptors used herein interpreted accordingly.

The terminology used herein is for the purpose of describing particular embodiments only and is not intended to be limiting of the described technology. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this described technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the described technology will be explained in detail with reference to the accompanying drawings. In this disclosure, the term "substantially" includes the meanings of completely, almost completely or to any significant degree under some applications and in accordance with those skilled in the art. Moreover, "formed, disposed or positioned over" can also mean "formed, disposed or positioned on." The term "connected" includes an electrical connection.

Figure 2:
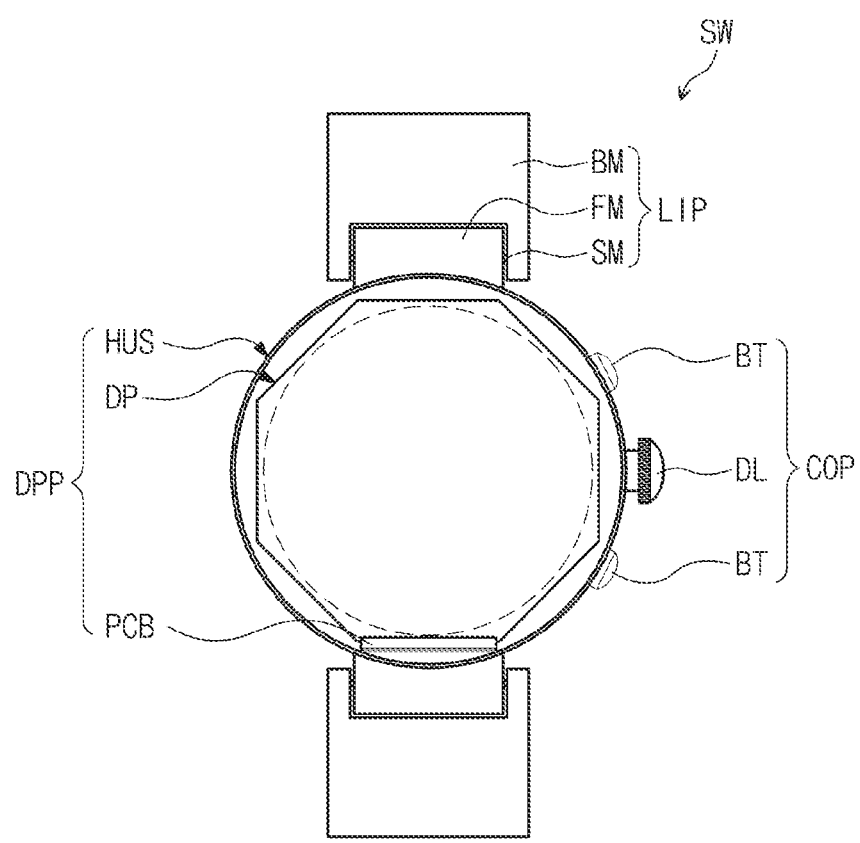
FIG. 2 is a plan view showing a smart watch according to an exemplary embodiment of the present disclosure.

FIG. 1 is a plan view showing a smart watch SW according to an exemplary embodiment of the present disclosure. FIG. 2 is a plan view showing a smart watch SW according to an exemplary embodiment of the present disclosure. In FIG. 2, a window cover WC shown in FIG. 1 is omitted.

Referring to FIGS. 1 and 2, the smart watch SW includes a display part (or display unit) DPP configured to display an image and a connection part (or connector) LIP connected to both ends of the display part DPP.

The connection part LIP includes a band member (or band) BM wrapped around a wrist of a user, a fixing member FM fixed to the display part DPP and connected to the band member BM, and a screw member (or screw) SM connecting the fixing member FM and the band member BM. The screw member SM is connected to the band member BM after penetrating through the fixing member FM. The screw member SM can be rotated inside the fixing member FM.

The smart watch SW can further include a control part (or controller) COP disposed at a portion of the display part DPP to control the display part DPP. The control part COP includes a plurality of buttons BT and a dial DL.

The display part DPP can include a window cover WC, a display panel DP, a circuit board PCB, and a housing HUS.

The window cover WC is disposed above the display panel DP to protect the display panel DP. The window cover WC defines a display area DA and a non-display area NDA of the display part DPP. The image is displayed in the display area DA and not displayed in the non-display area NDA disposed adjacent to the display area DA.

The window cover WC can be, but not limited to, a glass substrate, a sapphire substrate, or a plastic film. A colored organic layer can be disposed on a rear surface of the window cover WC to define the non-display area NDA. The organic layer can be formed by a coating method.

In the present exemplary embodiment, the window cover WC has a substantially circular shape. The display area DA defined by the window cover WC has the circular shape and the non-display area NDA has a substantially ring shape to surround the display area DA.

Although not shown in figures, the smart watch SW can further include a touch panel (not shown) disposed above or under the window cover WC.

The display panel DP provides the image through an area overlapping the display area DA defined by the window cover WC. The display panel DP has flexibility and is partially bent.

In the present exemplary embodiment, the display panel DP has a substantially quadrangular shape. The display panel DP can be partially bent while being accommodated in the housing HUS.

Hereinafter, the display panel DP will be described in detail.

Figure 3:
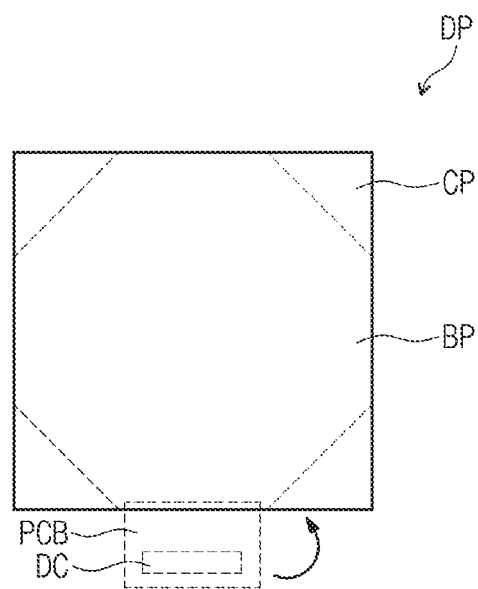
FIG. 3 is a plan view showing a display panel according to an exemplary embodiment of the present disclosure.
Figure 4:
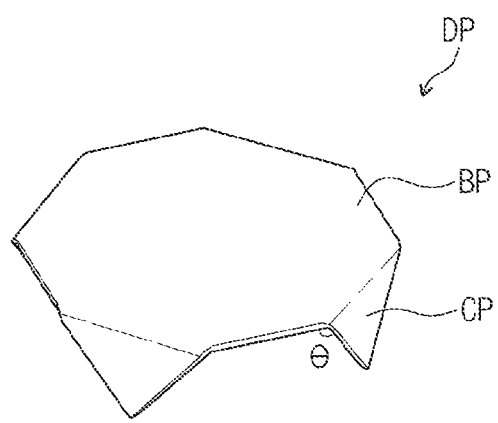
FIG. 4 is a perspective view showing a display panel according to an exemplary embodiment of the present disclosure.

FIG. 3 is a plan view showing a display panel according to an exemplary embodiment of the present disclosure. FIG. 4 is a perspective view showing a display panel according to an exemplary embodiment of the present disclosure.

Referring to FIGS. 3 and 4, the display panel DP includes a body portion (or body area) BP and a corner portion (or corner area) CP.

The body portion BP can have a substantially polygonal shape. In the present exemplary embodiment, the body portion BP has an octagonal shape, but it should not be limited thereto or thereby.

The corner portion CP extends from at least one side of the body portion BP and is bent from the body portion BP. The corner portion CP is defined by the one side of the body portion BP and sides extending from other sides, which are connected to the one side of the body portion BP, to meet each other. In the present exemplary embodiment, the corner portion CP has a substantially triangular shape, but it should not be limited thereto or thereby. That is, the shape of the corner portion CP can be changed depending on the shape of the display panel DP.

The corner portion CP can be disposed at each corner of the display panel DP. In the present exemplary embodiment, since the display panel DP has the quadrangular shape, the display panel DP includes four corner portions CP respectively disposed at four corners of the display panel DP.

The corner portion CP can be bent with respect to the one side of the body portion BP, at which the corner portion CP is disposed, to form a predetermined angle θ with the body portion BP. In FIG. 4, the predetermined angle θ is about 90 degrees, but it should not be limited thereto or thereby. That is, the predetermined angle θ is equal to or greater than about 0 degrees and equal to or smaller than about 180 degrees. As the number of the corner portion CP, which is bent, increases, the body portion BP has a shape close to the circular shape.

Referring to FIGS. 2 and 3 again, the circuit board PCB is disposed at at least one side portion (or side) of the display panel DP. The circuit board PCB is disposed at the other side of the body portion BP adjacent to the one side of the body portion BP where the corner portion CP is disposed. The circuit board PCB can have flexibility. The circuit board PCB can be bent to face a rear surface of the display panel DP. The circuit board PCB can include a driving chip DC mounted thereon to drive the display panel DP.

Although not shown in figures, a connector (not shown) is disposed between the circuit board PCB and the display panel DP to connect the circuit board PCB and the display panel DP. Accordingly, the circuit board PCB can be easily connected to or separated from the display panel DP.

Referring to FIGS. 1 and 2 again, the housing HUS is disposed under the display panel DP and accommodates the display panel DP and the circuit board PCB. The housing HUS is coupled to the window cover WC. The housing HUS has a substantially circular shape when viewed in a plan view. The housing HUS has substantially the same area as that of the window cover WC or an area greater than that of the window cover WC when viewed in a plan view.

The housing HUS can have the area greater than that of the body portion BP and smaller than an area obtained by adding the area of the body portion BP to the area of the corner portion CP. Therefore, the display panel DP is accommodated in the housing HUS while the corner portion CP is bent.

Hereinafter, the housing HUS will be described in detail with reference to accompanying drawings.

Figure 5:
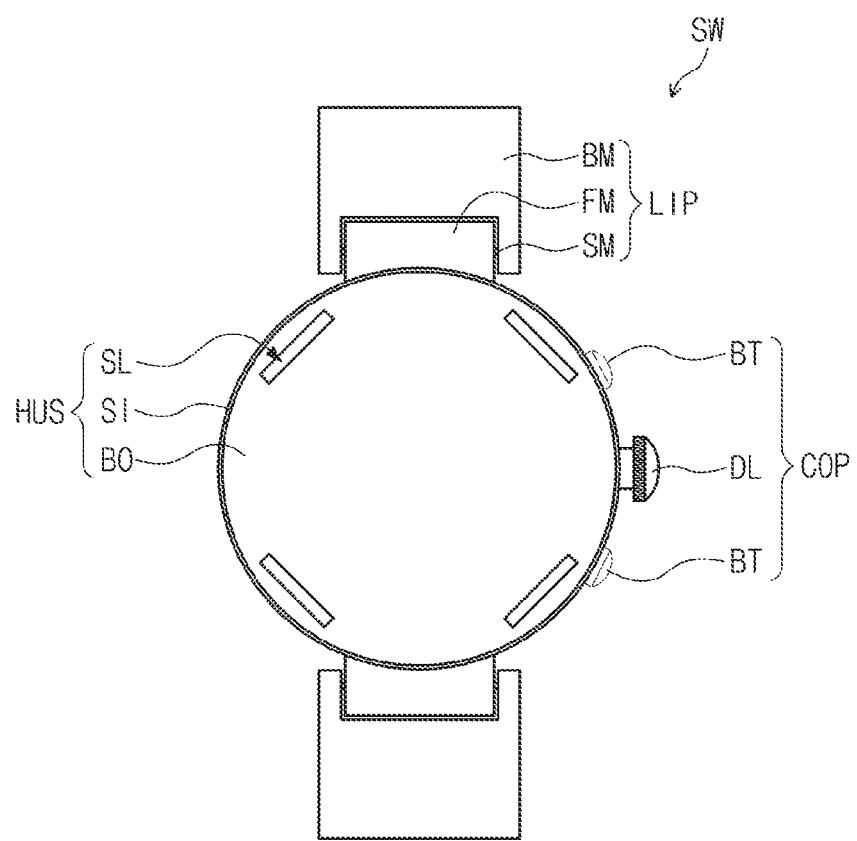
FIG. 5 is a plan view showing a housing according to an exemplary embodiment of the present disclosure.
Figure 6A:
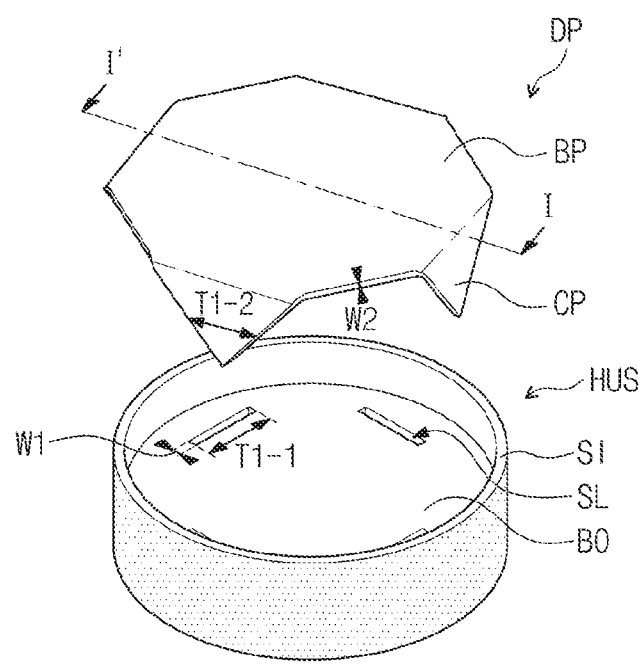
FIG. 6A is an exploded perspective view showing a smart watch according to an exemplary embodiment of the present disclosure.
Figure 6B:
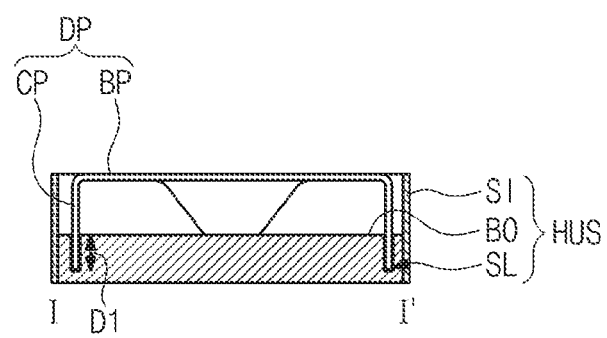
FIG. 6B is a cross-sectional view taken along line I-I' of FIG. 6A.

FIG. 5 is a plan view showing the housing US according to an exemplary embodiment of the present disclosure, in which the display panel DP is omitted from the smart watch SW shown in FIG. 2. FIG. 6A is an exploded perspective view showing the smart watch SW according to an exemplary embodiment of the present disclosure, in which the display panel DP and the housing HUS are separated from each other. FIG. 6B is a cross-sectional view taken along a line I-I' of FIG. 6A, in which the display panel DP and the housing HUS are coupled to each other.

Referring to FIGS. 5, 6A, and 6B, the housing HUS includes a bottom portion BO and a sidewall portion SI to define an inner space in which the display panel DP is accommodated.

The bottom portion BO overlaps the body portion BP. The bottom portion BO can have a shape different from that of the body portion BP. In the present exemplary embodiment, the bottom portion BO has a circular shape, but it should not be limited thereto or thereby as long as the bottom portion BO has an area greater than that of the body portion BP.

The bottom portion BP includes a slit SL formed by partially removing the bottom portion BP. The slit SL is formed at a position facing the corner portion CP. At least a portion of the corner portion CP is inserted into the slit SL.

The slit SL has a length T1-1 shorter than a length of the one side of the body portion BP, but it should not be limited thereto or thereby. That is, the slit SL has substantially the same length as that of the body portion BP.

In the present exemplary embodiment, the length T1-1 of the slit SL is substantially equal to a length T1-2 between mid-points of two sides of the corner portion CP connected to the one side of the body portion BP. Thus, a portion between the one side of the body portion BP and the mid-points of the corner portion CP is exposed to the outside on the bottom portion BO.

The slit SL has a width W1 equal to a thickness W2 of the display panel DP. As described above, since at least a portion of the corner portion CP is inserted into the slit SL, the display panel DP is fixed to the bottom portion BO.

The slit SL is formed in a direction substantially perpendicular to the bottom portion BO, but it should not be limited thereto or thereby. That is, the slit SL can be formed in an orthogonal direction according to the degree of the bending of the corner portion CP.

The bottom portion BO has a thickness greater than a depth D1 of the slit SL, into which the corner portion CP is inserted.

The sidewall portion SI faces a surface in a thickness direction of the bottom portion BO and extends along an edge of the bottom portion BO. The sidewall portion SI has a height, i.e., a vertical distance of the sidewall portion SI from a ground, greater than the thickness of the bottom portion BO.

In the present exemplary embodiment, the sidewall portion SI is formed of an opaque material. Accordingly, the non-display area of the display panel DP and the circuit board PCB, which are accommodated in the housing HUS, are not visible to the outside.

Figure 7:
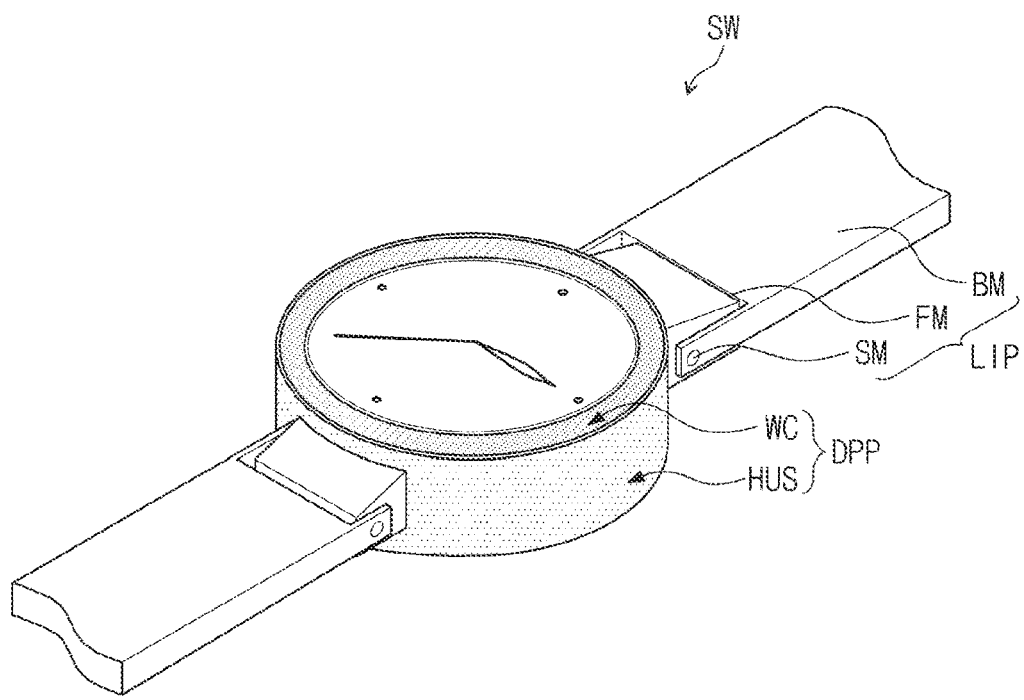
FIG. 7 is a perspective view showing a smart watch according to an exemplary embodiment of the present disclosure.

FIG. 7 is a perspective view showing a smart watch SW according to an exemplary embodiment of the present disclosure. In the present exemplary embodiment, the smart watch SW includes a display part DPP having a substantially circular shape.

In the exemplary embodiment of the present disclosure according to the smart watch SW, the display part having the circular shape can be formed by bending a portion of the typical display part. As a result, the smart watch SW can be manufactured by using the typical display panel having the polygonal shape instead of forming the display panel having the circular shape.

Hereinafter, other exemplary embodiments of the present disclosure will be described with reference to accompanying drawings. For the convenience of explanation, different features of the other exemplary embodiments from the above-mentioned embodiments will be mainly described.

Figure 8:
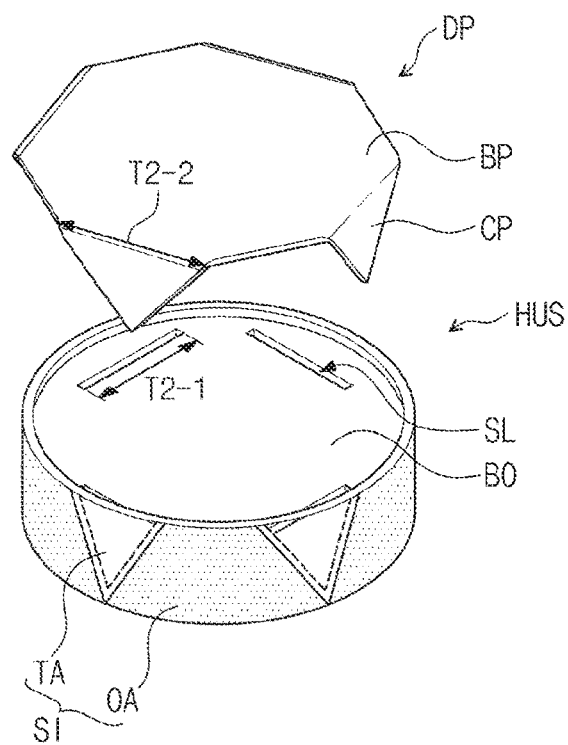
FIG. 8 is an exploded perspective view showing a smart watch according to another exemplary embodiment of the present disclosure.
Figure 9:
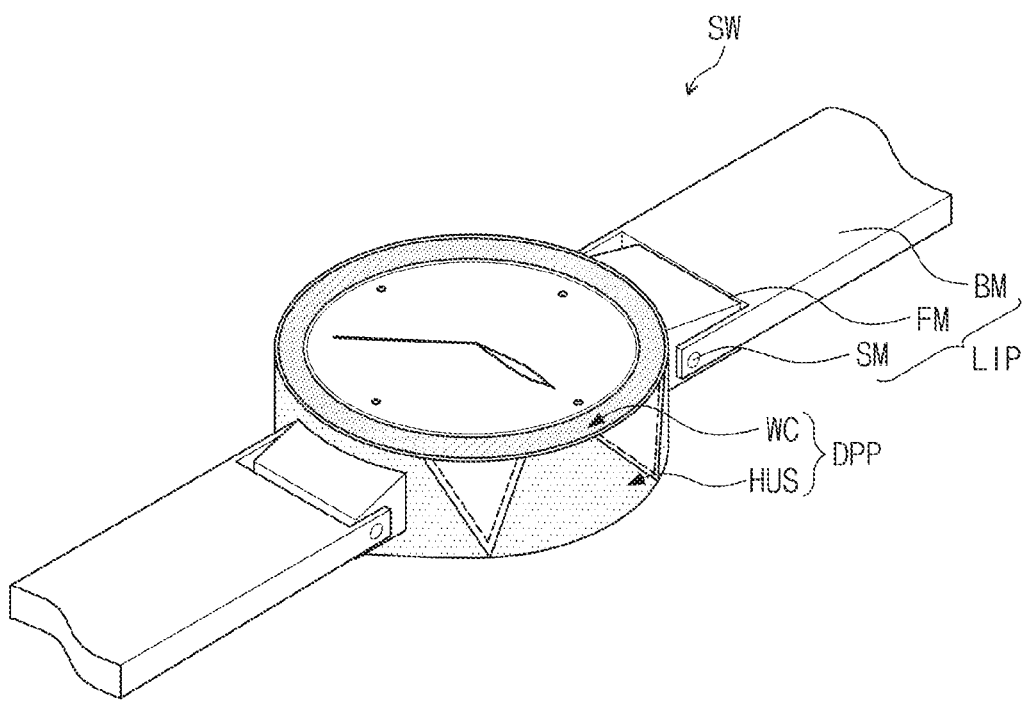
FIG. 9 is a perspective view showing a smart watch according to another exemplary embodiment of the present disclosure.

FIG. 8 is an exploded perspective view showing a smart watch according to another exemplary embodiment of the present disclosure. FIG. 9 is a perspective view showing a smart watch according to another exemplary embodiment of the present disclosure.

Referring to FIGS. 8 and 9, the smart watch SW includes a display panel DP and a housing HUS.

The display panel DP includes a body portion BP and a corner portion CP bent from the body portion BP.

The housing HUS accommodates the display panel DP. The housing HUS includes a bottom portion BO in which a slit SL is formed and a sidewall portion SI extending along an edge of the bottom portion BO.

The slit SL has a length T2-1 equal to a length T2-2 of one side of the body portion BP at which the corner portion CP is disposed. Therefore, the corner portion CP is inserted into the slit SL without being exposed to the outside on the bottom portion BO.

The bottom portion BO has a thickness greater than a vertical distance between the one side of the body portion BP and a vertex of the corner portion CP facing the one side of the body portion BP.

The sidewall portion SI can include a transparent area TA and an opaque area OA disposed adjacent to the transparent area TA. The transparent area TA faces at least a portion of the corner portion CP. Thus, the image displayed in the corner portion CP can be provided to the outside through the transparent area TA. The transparent area TA has substantially the same shape as that of the corner portion CP.

Although not shown in figures, a touch sensor (not shown) can be disposed in the transparent area TA. In this case, functions of the corner portion CP or the body portion BP can be carried out by touch the transparent area TA.

The opaque area OA is disposed between the transparent areas TA to cover the non-display area of the display panel DP and the circuit board PCB, so that the non-display area of the display panel DP and the circuit board PCB are not visible to the outside.

Figure 10:
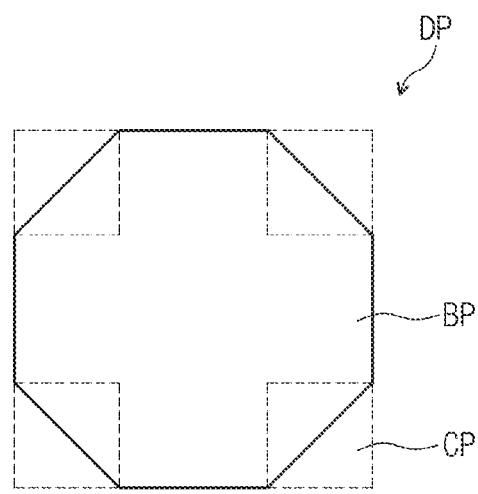
FIG. 10 is a plan view showing a display panel according to another exemplary embodiment of the present disclosure.
Figure 11:
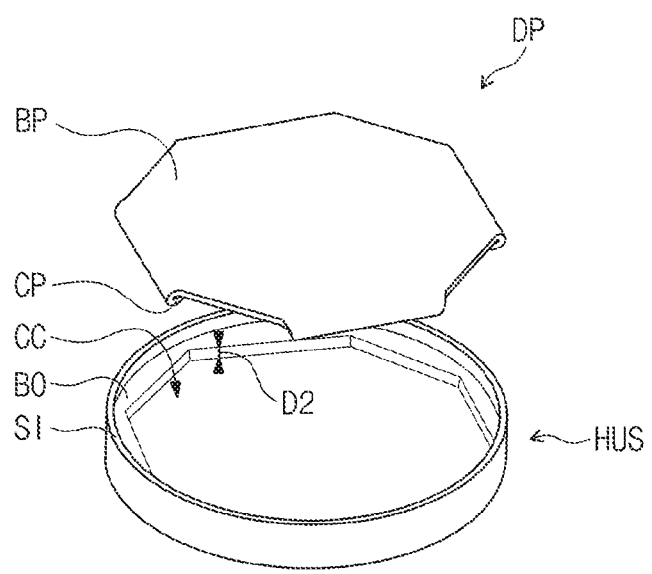
FIG. 11 is an exploded perspective view showing a smart watch according to another exemplary embodiment of the present disclosure.

FIG. 10 is a plan view showing a display panel DP according to another exemplary embodiment of the present disclosure. FIG. 11 is an exploded perspective view showing a smart watch according to another exemplary embodiment of the present disclosure.

Referring to FIGS. 10 and 11, the smart watch includes a display panel DP and a housing HUS.

The display panel DP includes a body portion BP and a corner portion CP bent from the body portion BP. In the present exemplary embodiment, a predetermined angle between the corner portion CP and the body portion BP is about 0 degrees. Therefore, the corner portion CP is disposed on the rear surface of the body portion BP to overlap with the body portion BP.

The housing HUS includes a bottom portion BO and a sidewall portion SI to define an inner space in which the display panel DP is accommodated.

In the present exemplary embodiment, the bottom portion BO includes a concave portion CC in a surface facing the body portion BP. The concave portion CC has substantially the same shape as that of the body portion BP. The concave portion CC can have an octagonal shape. The concave portion CC has a depth D2, i.e., a vertical distance between an upper surface of the bottom portion BO and an upper surface of the concave portion CC, which is equal to the thickness of the body portion BP or a thickness obtained by adding the thickness of the body portion BP to the thickness of the corner portion CP.

The display panel DP is accommodated in the concave portion CC while the corner portion CP is bent. Since the display panel DP is inserted into the concave portion CC, the display panel DP can be fixed to the bottom portion BO.

Since the corner portion CP is bent to overlap the body portion BP in the present exemplary embodiment, the overall thickness of the housing HUS can be reduced compared to that of the previously described embodiment. Accordingly, the substantially circular smart watch having a reduced thickness can be manufactured.

Figure 12:
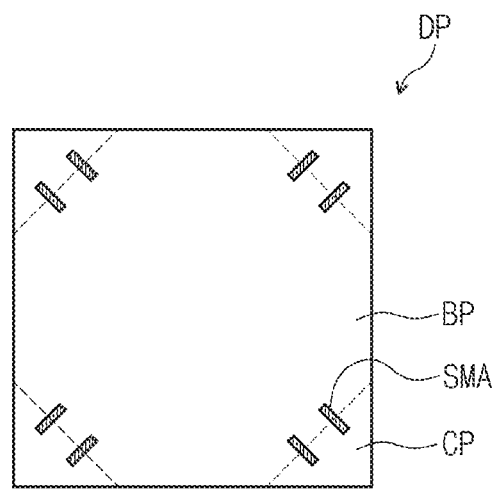
FIG. 12 is a plan view showing a display panel according to another exemplary embodiment of the present disclosure.
Figure 13:
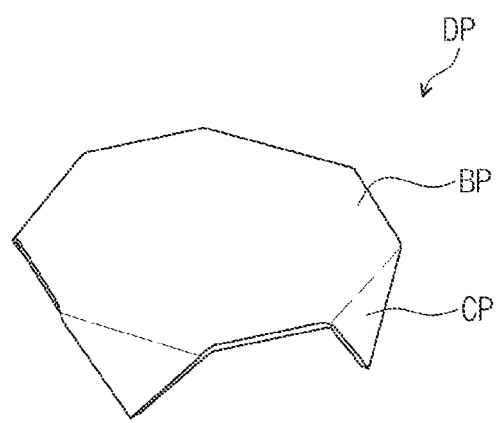
FIG. 13 is a perspective view showing a display panel according to another exemplary embodiment of the present disclosure.

FIG. 12 is a plan view showing a display panel DP according to another exemplary embodiment of the present disclosure. FIG. 13 is a perspective view showing a display panel DP according to another exemplary embodiment of the present disclosure.

Referring to FIGS. 12 and 13, a smart watch according to the present exemplary embodiment includes a display panel DP and a shape memory alloy SMA disposed on a rear surface of the display panel DP.

The shape memory alloy SMA is disposed to overlap with at least a portion of the one side of the body portion BP, at which the corner portion CP is disposed. The shape memory alloy SMA can be provided in a plural number and the shape memory alloys SMA are arranged spaced apart from each other at regular intervals along the one side of the body portion BP.

When the shape of the shape memory alloy SMA is deformed at a specific temperature, an angle between the corner portion CP and the body portion BP can be changed. For instance, when the corner portion CP is bent at the specific temperature in the display panel DP in a flat state in which the angle between the corner portion CP and the body portion BP is about 180 degrees, the angle between the corner portion CP and the body portion BP can be about 90 degrees.

Since the shape memory alloy SMA is disposed on the rear surface of the display panel DP, the shape of the display panel DP can be easily deformed even though the user does not apply a physical force to the display panel DP.

FIGS. 14A to 14E are views showing a method of replacing components of a smart watch according to an exemplary embodiment of the present disclosure. Hereinafter, the replacing method of the components of the smart watch will be described in detail with reference to FIGS. 14A to 14E.

The replacing method of the components of the smart watch according to the present exemplary embodiment includes separating a display panel in the bent state from a first housing, stretching the bent display panel to provide the display panel in the flat state, and assembling the flat display panel to a second housing having a shape different from that of the first housing.

Figure 14A:
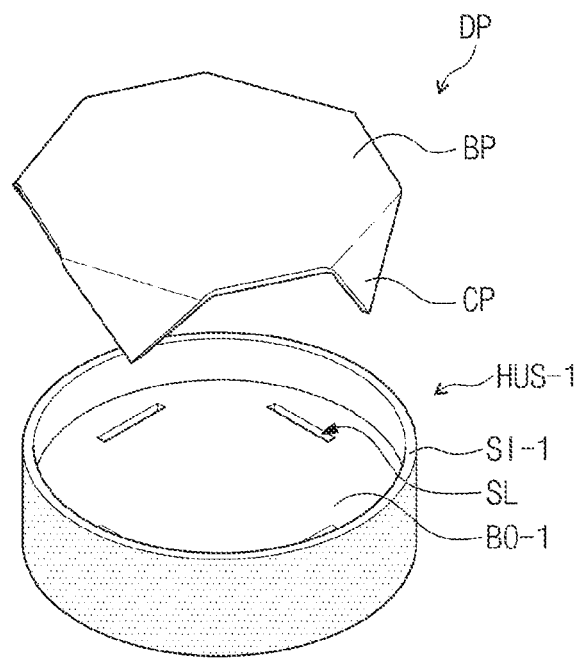
FIGS. 14A, 14B, 14C, 14D and 14E are views showing a method of replacing components of a smart watch according to an exemplary embodiment of the present disclosure.

FIG. 14A is a perspective view showing the separating of the bent display panel DP from the first housing HUS-1.

The display panel DP includes the body portion BP having the polygonal shape and the corner portion CP extending from at least one side of the body portion BP and bent from the body portion BP. The corner portion CP and the bottom portion BO maintain the predetermined angle. FIG. 14A shows the corner portion CP and the bottom portion BP forming the predetermined angle of about 90 degrees with the corner portion CP as an example.

The first housing HUS-1 includes a first bottom portion BO-1 and a first sidewall portion SI-1 to define an inner space in which the display panel DP is accommodated.

The first bottom portion BO-1 overlaps the body portion BP and has an area smaller than an area obtained by adding an area of the body portion BP to an area of the corner portion CP. In addition, the first bottom portion BO-1 can have a shape different from that of the body portion BP. In the present exemplary embodiment, the first bottom portion B)-1 can have a substantially circular shape when viewed in a plan view.

The first sidewall portion SI-1 faces the surface in the thickness direction of the first bottom portion BO-1 and extends along an edge of the first bottom portion BO-1. The sidewall portion SI has a height, i.e., a vertical distance from a ground, greater than the thickness of the first bottom portion BO-1.

The display panel DP can be separated from the first housing HUS-1.

Figure 14B:
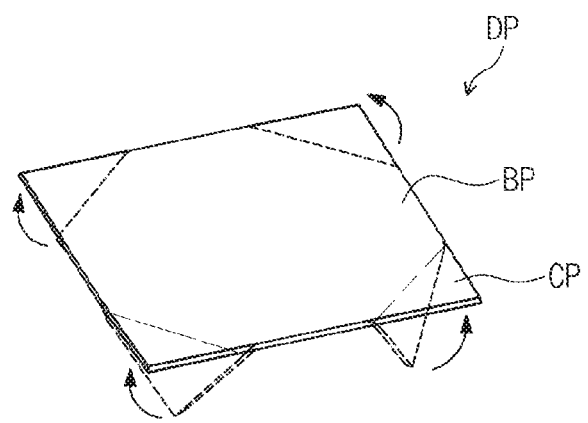

FIG. 14B shows the stretching of the bent display panel DP to provide the flat display panel DP.

Referring to FIG. 14B, the bent corner portion CP bent from the body portion BP can be stretched out. In this case, the predetermined angle between the corner portion CP and the body portion BP is about 180 degrees.

The corner portion CP is stretched out when the shape memory alloy (not shown) disposed on the rear surface of the display panel DP is deformed at the specific temperature. As another way, the corner portion CP can be stretched out in response to the physical force applied thereto by the user. In addition, the corner portion CP can include an electroactive polymer material that has a property of shrinking in response to an electricity applied thereto. Accordingly, when the display panel DP is separated from the first housing HUS-1, the corner portion CP can be stretched out again since the electroactive polymer material is not electrified. As described above, the corner portion CP can be stretched out through a variety of methods.

Figure 14C:
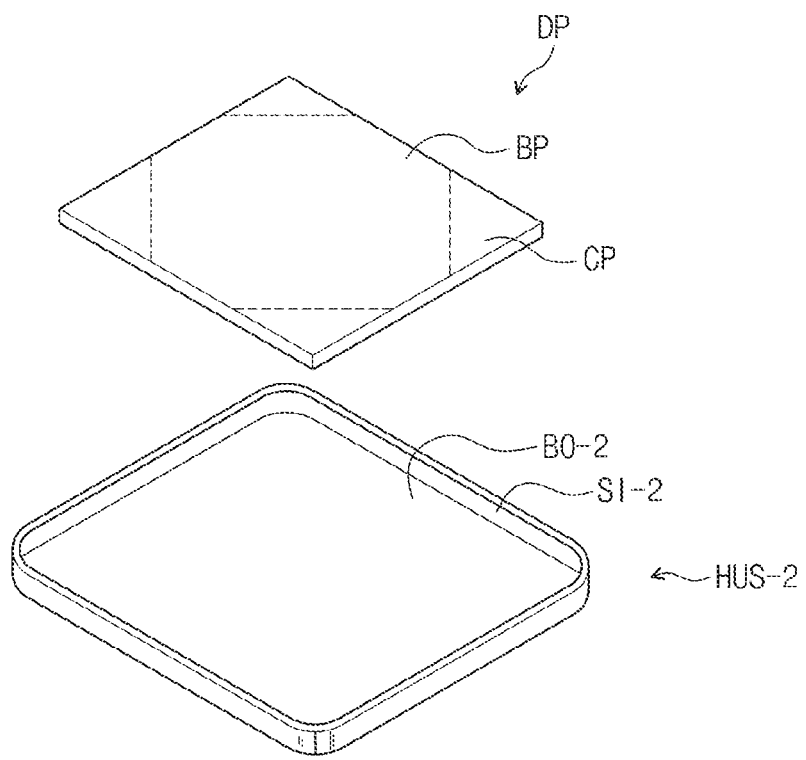

FIG. 14C shows the assembling of the flat display panel DP to the second housing HUS-2 having the shape different from that of the first housing HUS-1.

Referring to FIG. 14C, the flat display panel DP can be assembled to the second housing HUS-2.

The second housing HUS-2 includes a second bottom portion BO-2 and a second sidewall portion SI-2 to define an inner space in which the flat display panel DP is accommodated.

The second bottom portion BO-2 overlaps the flat display panel DP and has an area slightly greater than an area obtained by the area of the body portion BP and the area of the corner portion CP. The second bottom portion BO-2 can have substantially the same shape as that of the flat display panel DP. FIG. 14C shows the display panel DP having the quadrangular shape and the second bottom portion BO-2 having rounded corners.

The second sidewall portion SI-2 is bent from and extends from the second bottom portion BO-2. The second sidewall portion SI-2 extends along an edge of the second bottom portion BO-2.

Figure 14D:
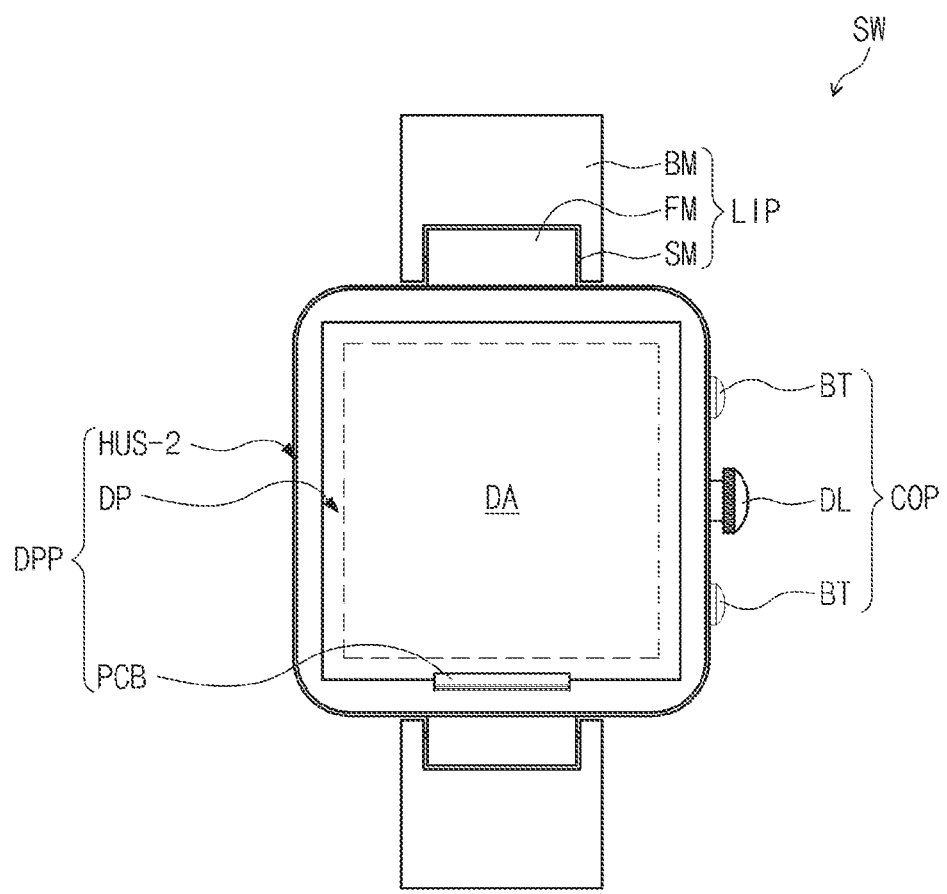

FIG. 14D shows a surface of a smart watch SW including the flat display panel DP.

Referring to FIG. 14D, the flat display panel DP is connected to the circuit board PCB disposed at one side portion of the display panel DP and operated. In the present exemplary embodiment, the flat display panel DP can provide a display area DA greater than the bent display panel DP.

The replacing method of the components of the smart watch according to the present exemplary embodiment can further include coupling of the second housing HUS-2 to the window cover WC.

Figure 14E:
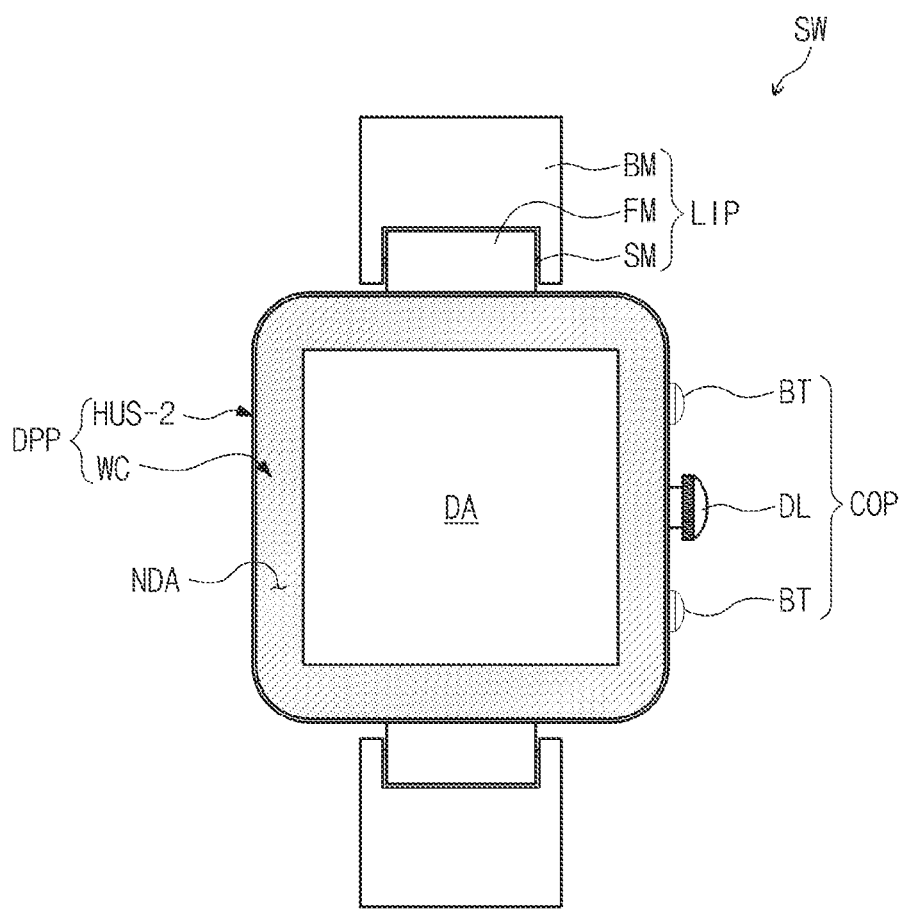

FIG. 14E shows the assembling of the second housing HUS-2 to the window cover WC.

Referring to FIG. 14E, the window cover is disposed on the flat display panel DP to define the display area DA and the non-display area NDA surrounding the display area DA.

The window cover WC is disposed on the second housing HUS-2 and coupled to the second housing HUS-2.

The window cover WC has substantially the same shape as that of the second bottom portion BO-2. Here, the window cover WC has the quadrangular shape having the rounded corners. The display area DA has the quadrangular shape and the non-display area NDA has the ring shape surrounding the display area DA.

According to another method of replacing components of the smart watch, the flat display panel can be separated from the second housing and assembled to the first housing.

The replacing method of the components of the smart watch according to another exemplary embodiment includes separating the flat display panel from the second housing, folding the corner port such that the corner portion forms the predetermined angle with the body portion to provide the bent display panel, and assembling the bent display panel to the first housing.

According to the above, the display panel DP can be deformed into a variety of shapes in accordance with the bending of the corner portion CP. In addition, since the housings HUS-1 and HUS-2 are replaced with each other according to the shape of the display panel DP, the display part DPP can be changed. Accordingly, the shape of the smart watch SW can be easily deformed depending on the need of the user.

Although the inventive technology been described, it is understood that the present invention should not be limited to these exemplary embodiments but various changes and modifications can be made by one ordinary skilled in the art within the spirit and scope of the present invention as hereinafter claimed.

What is claimed is:

1. A smart watch comprising:
    a display panel comprising a body portion having a polygonal shaped planar structure and a corner portion extending from one side of the body portion and being bent away from a surface of, and at the one side of, the body portion; and
    a housing disposed under the display panel and having an area that is smaller than the combined area of the body portion and the corner portion, wherein the corner portion is defined by the one side of the body portion and two sides extending from other sides of the body portion adjacent to the one side to meet each other.

2. The smart watch of claim 1, wherein the body portion has a substantially octagonal shape.

3. The smart watch of claim 2, wherein the corner portion has a substantially triangular shape.

4. The smart watch of claim 3, wherein the display panel has a substantially quadrangular shape when the body portion is placed on the same surface as the corner portion.

5. The smart watch of claim 4, wherein the housing comprises:
    a bottom portion having a planar surface overlapping the body portion; and
    a sidewall portion surrounding the bottom portion and extending along an edge of the bottom portion.

6. The smart watch of claim 5, wherein the bottom portion and the body portion have different shapes.

7. The smart watch of claim 5, wherein the bottom portion has a substantially circular shape.

8. The smart watch of claim 5, wherein the bottom portion has a slit through which the corner portion passes.

9. The smart watch of claim 8, wherein each of the corner portion and the slit is provided in the plural, and wherein each of the corner portions is inserted into each of the slits.

10. The smart watch of claim 8, wherein less than half of the corner portion is inserted into the slit.

11. The smart watch of claim 5, wherein the bottom portion comprises a concave portion having the same shape as the body portion.

12. The smart watch of claim 5, wherein the sidewall portion comprises a transparent area facing the corner portion and an opaque area disposed adjacent to the transparent area.

13. The smart watch of claim 1, further comprising a shape memory alloy disposed under a lower surface of the display panel, wherein at least a portion of the shape memory alloy overlaps the one side of the body portion.

14. The smart watch of claim 1, further comprising a window cover disposed over the display panel and coupled to the housing, wherein the window cover has the same shape as the bottom portion.

15. The smart watch of claim 1, further comprising a circuit board connected to the one side of the body portion.

16. A method of replacing a component of a smart watch, the method comprising:
    separating a display panel in a bent state from a first housing, the bent display panel comprising a body portion having a polygonal shape and a corner portion extending from at least one side of the body portion and bent from the body portion;

stretching out the corner portion such that the corner portion is placed on the same surface as the body portion to provide the display panel in a flat state; and assembling the flat display panel to a second housing having a shape different from that of the first housing.

17. The method of claim 16, wherein the first housing comprises:

a first bottom portion overlapping the body portion and having an area smaller than a combined area of the body portion and the corner portion; and a first sidewall portion extending along an edge of the first bottom area in a thickness direction of the first bottom portion.

18. The method of claim 17, wherein the second housing comprises:

a second bottom portion overlapping the flat display panel and having an area greater than the combined area; and a second sidewall portion bent from the second bottom portion.

19. The method of claim 18, further comprising assembling a window cover having the same shape as the second bottom portion to the second housing.

20. A method of replacing a component of a smart watch, the method comprising:

separating a display panel in a flat state from a first housing, the flat display panel comprising a body portion having a polygonal shape and a corner portion extending from at least one side of the body portion;

folding the corner portion such that the corner portion forms a predetermined angle with the body portion to provide the display panel in a bent state; and assembling the bent display panel to a second housing having a shape different from the first housing.

* * * * *